United States Patent
Rosso et al.

(10) Patent No.: US 9,761,877 B2
(45) Date of Patent: Sep. 12, 2017

(54) ANODES INCLUDING METHYLATED AMORPHOUS SILICON FOR LITHIUM ION BATTERIES

(75) Inventors: Michel Rosso, Marcoussis (FR); Larbi Touahir, Croix (FR); Abdelhak Cheriet, Eleulma-Setif (DZ); Ionel Solomon, Boulogne-Billancourt (FR); Jean-Noel Chazalviel, Antibes (FR); Francois Ozanam, Leuville-sur-Orge (FR); Noureddine Gabouze, Alger (DZ)

(73) Assignees: ECOLE POLYTECHNIQUE, Palaiseau (FR); CENTRE NATIONAL DE LA RECHERCHE SCIENTIFIQUE, Paris (FR); CENTRE DE RECHERCHE EN TECHNOLOGIE DES SEMI-CONDUCTEURS POUR L'ENERGETIQUE (CRTSE), Alger (DZ)

( * ) Notice: Subject to any disclaimer, the term of this patent is extended or adjusted under 35 U.S.C. 154(b) by 86 days.

(21) Appl. No.: 14/119,526

(22) PCT Filed: May 23, 2012

(86) PCT No.: PCT/FR2012/051161
§ 371 (c)(1),
(2), (4) Date: Nov. 22, 2013

(87) PCT Pub. No.: WO2012/160315
PCT Pub. Date: Nov. 29, 2012

(65) Prior Publication Data
US 2014/0079997 A1     Mar. 20, 2014

(30) Foreign Application Priority Data

May 24, 2011   (FR) ..................... 11 54525

(51) Int. Cl.
H01M 4/04      (2006.01)
H01M 4/134     (2010.01)
(Continued)

(52) U.S. Cl.
CPC ......... H01M 4/602 (2013.01); H01M 4/0421 (2013.01); H01M 4/0428 (2013.01);
(Continued)

(58) Field of Classification Search
CPC .................................................. H01M 10/052
(Continued)

(56) References Cited

U.S. PATENT DOCUMENTS

2006/0275668 A1   12/2006   Peres et al.
2007/0128516 A1   6/2007    Im et al.

FOREIGN PATENT DOCUMENTS

EP   1 722 429 A2   11/2006
EP   2 113 960 A1   11/2009
(Continued)

OTHER PUBLICATIONS

Touahir et al., Surface Plasmon Resonance on Gold and Silver Films Coated with Thin Layers of Amorphous Silicon-Carbon Alloys, Feb. 2010, Langmuir, 26, 6058-6065.*
(Continued)

Primary Examiner — Sean P Cullen
(74) Attorney, Agent, or Firm — Young & Thompson (57) ABSTRACT

The use of a methylated amorphous silicon alloy as the active material in an anode of Li-ion battery is described. Lithium storage batteries and anodes manufactured using the material, as well as a method for manufacturing the electrodes by low-power PECVD are also described.

34 Claims, 8 Drawing Sheets

(51) Int. Cl.
*H01M 4/1395* (2010.01)
*H01M 4/38* (2006.01)
*H01M 4/60* (2006.01)
*H01M 4/66* (2006.01)
*H01M 10/052* (2010.01)
*H01M 4/36* (2006.01)

(52) U.S. Cl.
CPC ......... *H01M 4/134* (2013.01); *H01M 4/1395* (2013.01); *H01M 4/366* (2013.01); *H01M 4/38* (2013.01); *H01M 4/386* (2013.01); *H01M 4/661* (2013.01); *H01M 10/052* (2013.01); *Y02E 60/122* (2013.01); *Y02P 70/54* (2015.11)

(58) Field of Classification Search
USPC .......................................... 429/213; 427/578
See application file for complete search history.

(56) References Cited

FOREIGN PATENT DOCUMENTS

| | | |
|---|---|---|
| FR | 2885734 A1 | 11/2006 |
| JP | 2005235397 A | 9/2005 |
| WO | 2007/053704 A2 | 5/2007 |

OTHER PUBLICATIONS

Schade et al., Optical properties and quantum efficiency of a-Si1-xCx:H/a-Si:H solar cells, Jan. 1985, Journal of Applied Physics, 57, 568-574.*

Mui et al, Optical constants of a series of amorphous hydrogenated silicon-carbon alloy films: Dependence of optical response on film microstructure and evidence for homogenous chemical ordering, May 1987, Physical Review B, 35, 8089-8102.*

Solomon et al, Band structure of carbonated amorphous silicon studied by optical, photoelectron, and x-ray spectroscopy, Dec. 1988, Physical Review B, 38, 13263-13270.*

Specific surface area. (Aug. 17, 2015). In Wikipedia, The Free Encyclopedia. Retrieved 11:14, Sep. 9, 2015, from https://en.wikipedia.org/w/index.php?title=Specific_surface_area&oldid=676592823.*

Fidelis A et al.: "Fully methylated atomically flat (111) silicon surface" Jan. 1, 2000. Surface Science 20000101 Elsevier Science B.V. vol. 444. NR. 1. pp. L7-L10, XP002665480, the whole document, Cited in ISR.

Solomon et al.: "Selective low-power plasma decomposition of silane-methane mixtures for the preparation of methylated amorphous silicon". Physical Review B. vol. 38. No. 14. Nov. 15, 1988, pp. 9895-9901, XP002665481, cited in the application the whole document.

International Search Report, dated Aug. 21, 2012, from corresponding PCT application.

* cited by examiner

ANODES INCLUDING METHYLATED AMORPHOUS SILICON FOR LITHIUM ION BATTERIES

BACKGROUND OF THE INVENTION

Field of the Invention

The present invention relates to the use of a methylated amorphous silicon alloy as the active material of an anode for a Li-ion battery. It relates to the negative electrodes (anodes) manufactured using this material, as well as the lithium storage batteries whose anode comprises this material. The invention has also for object a method for manufacturing such electrodes.

The material of the invention differs from those already known for manufacturing anodes for lithium-ion storage batteries by its high charge/discharge capacity, its high coulombian efficiency, the improvement of the cycling properties (a greater number of cycles is possible), its high charge-discharge speed, its easiness of implementation.

Description of the Related Art

The large increase of the use of portable electronic devices requires storage batteries having higher and higher energetic capacities. In particular, this concerns the portable communication devices, the portable electronic devices, notably the computers. The electric or hybrid vehicles are another important application for high capacity storage batteries.

Such devices widely use lithium-ion batteries. However, the present performances of this type of batteries are insufficient. The anode is an important component of a lithium battery. The role of the anode consists in lithium insertion or incorporation during the cycle of charge of the battery, and lithium release when the battery is discharged. In many cases, the lithium insertion and release may lead to volume changes that cause physical perturbations in the electrochemically active material of the anode and thus compromise the integrity thereof. This loss of integrity leads to a decrease of performance of the battery with the repetition of the charge and discharge cycles. Hence, it is expected that the stability and the performances of the battery will be improved if this degradation of the electrode materials can be avoided or reduced.

The lithium-ion storage batteries presently available in the market comprise a carbon-based anode and a cathode based on doped $LiNiO_2$, $LiCoO_2$, $LiMnO_2$ or doped $LiMn_2O_4$. Such storage batteries have limited mass and volume energies. The carbon-based anode of these batteries has a rather long life span, but a limited reversible capacity. The reversible capacity is defined as the quantity of electricity generated during the discharge by the reversible di-insertion of the lithium atoms out of the anode. Hence, the energy delivered by a lithium storage battery is limited by its anode.

Silicon has been known for long as a very promising material for the Li-ion batteries due to its capacity to accept insertion of great quantities of lithium, a capacity that is twelve times higher than that of the graphite used in the commercial batteries. The use thereof has been greatly limited until now by the very large swelling of the material in the charging state (about 300%). Solutions to this swelling problem have been proposed. They require the use of silicon in nanometric form (layers of nanometric thickness, powder with grains of nanometric size, nanowires or nanotubes).

If these materials have a high theoretical mass capacity (2000 to 4000 mAh/g), their strength to cycling remains very bad, because the very large volume variations caused by the lithium insertion/de-insertion cycles harm the integrity of these highly divided materials.

Moreover, the stoichiometric SiC alloy does not accept lithium insertion. On the other hand, the use of carbon and silicon in an heterogeneous mixture (Si powder surrounded by carbon, binders, etc. . . . ) allows improving the cycling properties of the silicon, but without fully solving the problems linked to the swelling due to the lithium.

The hydrogenated amorphous silicon (a-Si:H) is a material in which the silicon atoms adopt a tetrahedral local environment (corresponding to a hybridization state referred to as $sp^3$), as in the crystalline silicon, but whose arrangement has no order over a long distance, contrary to the crystalline silicon. The material, which may be advantageously obtained as a thin layer by plasma-enhanced decomposition of silane ($SiH_4$) (according to a plasma-enhanced chemical vapor deposition technique, known as PECVD), contains a high quantity of hydrogen, a part of which is mobile within the material and a part of which is engaged in links with silicon atoms. The presence of hydrogen in the material allows providing it with semi-conductor properties, by limiting the density of the electronic states in its forbidden band, which allows in particular doping it and providing it with a conduction through the electrons of its conduction band (N-type material) or through those of its valence band (P-type material). The hydrogenated amorphous silicon is a material whose use as thin layers has been contemplated for the lithium batteries. Although it does not suffer from the drawback of having to undergo a transition from the crystalline state to the amorphous state during the first charge/discharge cycle, the materiel proves to have performances, in terms of cycling, which are limited to about twenty cycles (see for example H. Jung et al., Journal of Power Sources 115 (2003) 346-351).

W. J. Zhang, J. Power Sources 196 (2011) 13-24 proposes a review of the studies about the electrochemical properties of the new materials for Li-ion battery anodes.

Several authors have proposed Si—C composites that are stable or pseudo-stable under cycling and that have mass capacities of 500 to 900 mAh/g.

A composite is defined as a material formed of several components to obtain particular mechanical properties. However, the composite synthesis is accompanied by the formation of silicon carbide, which harms the electrochemical performances of these composites.

In particular, D. Larcher et al., Solid State Ionics 12, 71 (1999); D. Larcher et al., Electrochim. Acta 44, 406>9 (1999) have described SiC composites prepared by pyrolysis under argon of pitch/polysilane blends. This method leads to Si-rich nanoparticles included in a disordered carbon matrix.

Other composites have been described by J. Yang et al., Electrochem. Solid State Lett. 6, 154 (2003); J. Saint et al., Adv. Funct. Mater. 17, 1765 (2007); FR2885734; EP1722429. They are SiC composites obtained by pyrolysis at 900° C. of intimate mixtures of Si/PVC under $N_2$. The reversible capacity is of about 1000 mAh/g during 20 cycles. The irreversible capacity is of about ⅓ of the reversible capacity. The authors have observed that the carbon coating exerts a force of compression on the silicon inclusions, which is necessary for a good cyclability. A grinding, even moderated, of the material destroys this effect.

WO2007/053704A2 describes a new material for negative electrodes of lithium batteries. This material is consisted of an active material subjected to volume variations and of a metal or metal-oxide based buffer material improving the cyclability. But, as with the composites, the swelling of the active material requires a demanding arrangement between the active material and the buffer material, and this arrangement proves difficult to implement for a high-capacity electrode.

Besides, A. M. Wilson, J. R. Dahn, J. Electrochem. Soc. 142, 326 (1995) have described the preparation of silicon nanoparticles maintained in a graphite matrix, by CVD of a silane/methane mixture. However, a lack of reproducibility of this method has been observed and the cost of these materials is very high.

JP2005-235397 describes anodes for lithium-ion batteries based on amorphous silicon and at least one impurity chosen among carbon, nitrogen, oxygen, argon and fluorine. However, it is observed that the tests of cyclability are limited to a very low number of charge/discharge cycles (five) and that, for a concentration of carbon exceeding 2%, the inventors didn't even manage to reach this number. The cyclability of the described materials hence appears to be very low. As regards the carbon materials, it can be noted that the conditions of preparation by PECVD require a high power for exciting the plasma, which very likely leads to the formation of graphite carbon.

SUMMARY OF THE INVENTION

The object of the invention was to solve the prior art problems, i.e. the preparation of an anode material for Li-ion battery of high mass charge/discharge capacity and high efficiency, with good cycling properties, including for high charge/discharge speeds. Furthermore, it has been searched to develop a material whose preparation is simple to implement, with a reproducible and reliable method.

The invention is based on the use of methylated amorphous silicon as the active material for manufacturing an electrode. In particular, it is based on the manufacturing of an alloy based on methylated amorphous silicon, which is used as the active material for manufacturing an anode for a Li-ion battery. The alloy is deposited by PECVD (plasma-enhanced chemical vapor decomposition) on a support. The use of thin layers (for example, layers of 70 nm deposited on stainless steel) allows benefiting from a high mass charge/discharge capacity and a high efficiency in comparison to the presently known systems. Such an anode, easy to implement, allows improving the cycling properties (a great number of cycles may be reached) in comparison to the systems using an anode made of a silicon/carbon composite, including for high charge/discharge speeds.

In more details, the invention relates to an anode for a Li-ion battery comprising at least one substrate (S) supporting on at least one portion of its surface a coating including at least one material based on methylated amorphous silicon (MS). Preferably, the coating based on methylated amorphous silicon is in the form of a continuous thin layer.

The substrate (S) may be consisted of any conductive material into which the lithium ions cannot be inserted or only scarcely, adapted to support the upper layer(s), in particular the layer (MS). The property of a material not to accept insertion of lithium may be evaluated in a manner that is well known by the one skilled in the art by performing cycling tests during which it is verified that the reversible capacity of the substrate is negligible and that the latter is passivated after one or a few cycles. The substrate (S) may be in the form of a solid support, bare or covered with a layer, a film or an adapted coating. Advantageously, the substrate (S) includes at least one layer based on a metal or an alloy of metals chosen among: copper, nickel, iron, stainless steel (SS), molybdenum or tungsten. In particular, the substrate may be fully metallic, for example it may be a metal sheet. The substrate may be in the form of a planar and continuous surface. It may also have any shape adapted to a use as an electrode, in particular it may be of cylindrical shape. Advantageously, the substrate has a high specific surface area. Such a substrate is advantageously chosen among those having a high surface roughness, such as those described in particular in EP-2 031 082, which proposes a crystallographically textured metal substrate. Preferably, the substrate has a specific surface area higher than its geometric surface area, preferably higher than or equal to twice its geometric surface area, advantageously higher than or equal to five times its geometric surface area, even better higher than or equal to ten times its geometric surface area. Indeed, for an equivalent surface area, the presence of a textured substrate, in comparison to a smooth material, allows increasing the quantity of material (MS) deposited on the substrate and thus increasing the capacity thereof.

The substrate (S) advantageously comprises a metal film layer and can include one or several layers supporting the metal film. The material (MS) is deposited directly on the metal film or on an intermediate layer between the metal film and the layer (MS). Advantageously, the material (MS) is deposited directly on the layer based on a metal or an alloy of metals, in particular on the metal film.

According to a preferred variant of the invention, the layer of methylated amorphous silicon is deposited as a continuous thin layer. For a battery electrode, the thin layer geometry allows placing into direct contact the active material of the electrode and the charge collector. This avoids the complications linked to the shaping of an electrode as a composite combining active material, material collecting the charges and binder ensuring the electrode cohesion; conversely, it is less easy to make with this geometry an electrode of high volume capacity. In the preferred embodiments describing the invention, this geometry has been favored because it allows exploiting the intrinsic characteristics of the material constituting the active material.

The scope of the invention is however not limited to this particular embodiment. It also includes the use of the methylated amorphous silicon in other forms, such as: particles of methylated amorphous silicon of small size, distributed in a matrix to form a composite, porous or non-porous matrix based on methylated amorphous silicon, incorporating for example nanometric particles of other materials such as silicon, nanostructures based on methylated amorphous silicon, deposited on a current collector, or in the form of a coating on the surface of a current collector having a large developed surface area. Such forms of electrodes based on methylated amorphous silicon may prove advantageous to have an electrode with a great capacity and supporting without deterioration a great number of charge and discharge cycles in these geometries constituting other embodiments.

The methylated amorphous silicon (a-$Si_{1-x}(CH_3)_x$:H) is a material related to the hydrogenated amorphous silicon in that the silicon atoms keep a local tetrahedral environment and in that the material has no order over a long distance. The material is a particular alloy of silicon and carbon, in which the carbon is incorporated essentially as methyl groups $CH_3$. This means that: i) the carbon atoms within the material also adopt a tetrahedral environment corresponding to a $sp^3$ hybridization; ii) the methyl groups break the continuity of the amorphous lattice in that they cannot ensure a bridging role between two silicon atoms (or between a silicon atom and a carbon atom).

Within the meaning of the present invention, "layer, or material, based on methylated amorphous silicon" means a layer of material, or the material itself, amorphous, comprising predominantly methylated amorphous silicon, in particular from 50 to 100% of methylated amorphous silicon, in mass fraction. Advantageously, the layer or the material (MS) is consisted of methylated amorphous silicon, possibly doped up to a maximum of 3 atomic percent of impurities.

The layer (MS) may be doped by inclusion of impurities, for example by inclusion of usual dopants of the silicon, such as atoms of phosphorus or boron, arsenic, antimony, aluminum, gallium, indium, bismuth. This doping allows increasing the conductivity of the layer (MS). The quantity of these impurities may be comprised, for example, between 0.001 and 3 atomic percent in the layer (MS). These impurities may be introduced by ion implantation, diffusion, or during a PECVD process, in the form of a gas added to the reaction mixture. It may be, for example, diborane for the boron or phosphine for the phosphorus.

An advantage of the methylated amorphous silicon obtained in "low-power" regime is that it keeps good optical and semi-conductor properties. This allows it to be doped to obtain a material of N or P type, as in the case of the amorphous silicon a-Si:H. For example, to provide the methylated amorphous silicon with a N-type character, a low quantity of phosphine $PH_3$ may be added to the gaseous mixture. This doping allows providing the material with a better electronic conductivity. For the use as an electrode material within a battery, it is advantageous when the methylated amorphous silicon is used as a thin layer or a coating on a current collector. It avoids in particular the presence of undesirable series resistances within a battery. Moreover, the lithium also plays the role of a N-type dopant: the previous doping, for example by phosphorus, allows ensuring this role independently of the lithiation of the material and stabilizes the properties thereof during the charge/discharge cycles.

Within the meaning of the present invention, "amorphous" means a non-crystalline form of the silicon, i.e. the material has no order over a long distance.

Within the meaning of the present invention, "continuous coating" means a coating in the form of a film covering entirely a portion at least of the substrate.

The material constituting the layer of methylated amorphous silicon may be described by the chemical formula (I):

$$a\text{-}Si_{1-x}(CH_3)_x:H \text{ with } 0 < x \leq 0.4 \quad \text{(I)}$$

According to a preferred variant of the invention, in the formula (I) $0.1 \leq x \leq 0.25$.

The use of the methylated amorphous silicon as an anode material for lithium-ion batteries has substantial advantages: i) the use of a material predominantly based on silicon allows benefiting from a reversible charge/discharge capacity close to that of the silicon; ii) the presence of methyl groups reduces the mean coordinancy of the three-dimension lattice formed by the silicon atoms, which soften the material, allows it to better support the volume variations associated with the charge and discharge processes and allows obtaining a better cyclability of the battery. The composition of the methylated amorphous silicon $a\text{-}Si_{1-x}(CH_3)_x:H$ has thus to be chosen with a content of methyl groups x that is low enough to optimize the charge/discharge capacity of the electrode, but high enough to provide the material with a sufficient elasticity. The presence of $CH_2$ groups forming units Si—$CH_2$—Si reticulating the silicon atom lattice contributes to rigidify the material and has to be avoided. Likewise, the presence of carbon atoms in a $sp^2$ hybridization state tends to form within the material small carbon clusters that harm the capacity of the electrode, which must also be avoided. In practice, it is difficult, with the ways of making the materials, to obtain methylated amorphous silicon $a\text{-}Si_{1-x}(CH_3)_x:H$ for an arbitrary value of the content of methyl groups x. It is therefore important to have characterization techniques available for specifying the nature of an hydrogenated amorphous alloy of silicon and carbon and determining if it can be considered as a material of the methylated amorphous silicon type.

In the publications of the prior art, the authors have designated indifferently by the formula $a\text{-}Si_{1-x}C_x:H$ materials of the amorphous alloy type or materials comprising graphite inclusions. In reality, when the carbon and the silicon form a single homogeneous phase in which the carbon is present in $sp^3$ form, the following formula (II) is more representative of this material:

$$a\text{-}Si_{1-x}(CH_3)_{x-y}(CH_2)_y:H \text{ with } 0 < x \leq 0.4 \text{ and } y \leq x \quad \text{(II)}$$

Ideally, the methylated amorphous silicon corresponds to a material described by the formula (II) in the case where $y=0$, for which the formula (I) is obtained. Within the meaning of the present document, it will be called methylated amorphous silicon a material constituting an homogeneous phase for which: i) the presence of carbon atoms in a $sp^2$ hybridization state is low enough, so that the material can be described with a good approximation by the formula (II); ii) a significant part of the carbon is incorporated as methyl groups, so that, in the formula (II) describing the material with a good approximation, y is low enough relative to x. The meaning of the phrases "low enough" and "small enough" in the above conditions will be explained more precisely in the two following paragraphs.

Infrared spectroscopy allows determining in a simple way the nature of the different alloys $a\text{-}Si_{1-x}C_x:H$. In general, the elongation vibrations of the C—H links between 2800 and 3100 $cm^{-1}$ allows specifying the hybridization state of the carbon atom and the nature of the hydrocarbon groups present. For a carbon atom in a $sp^3$ hybridization state, the contribution of the $CH_3$ groups is in the form of two peaks centered in the vicinity of 2885 and 2950 $cm^{-1}$, and that of the $CH_2$ groups is in the form of two peaks in the vicinity of 2860 and 2920 $cm^{-1}$. The exact position of these peaks may slightly depend on the composition of the material and their width is such that they partially overlap each other. But the procedures of spectral adjustment or deconvolution familiar to the one skilled in the art allow revealing these various contributions. The region corresponding to the deformation vibrations allows isolating even more neatly the respective contributions of the $CH_2$ and $CH_3$ groups. A very characteristic contribution of the $CH_3$ groups is found in the form of a peak centered between 1235 and 1250 $cm^{-1}$. Likewise, a characteristic contribution of the $CH_2$ groups is found in the form of a peak centered in the vicinity of 1450 $cm^{-1}$. Between these two characteristics peaks, two other peaks associated with the $CH_3$ groups are isolated, one centered between 1340 and 1360 $cm^{-1}$ and the other at about 1400 $cm^{-1}$; these peaks are however less intense than that which is centered between 1235 and 1250 $cm^{-1}$. For a carbon atom in a $sp^2$ hybridization state, the elongation vibrations of the C—H links are characteristic and are located between 3000 and 3100 $cm^{-1}$. A methyl group Si—($CH_3$) also differs from a bridging group Si—($CH_2$)—Si by the spectrum of the elongation vibrations Si—C: a single peak toward 770 $cm^{-1}$ for a methyl group, an additional peak toward 1100 $cm^{-1}$ for a bridging group.

In the present document, methylated amorphous silicon will refer to a silicon-carbon alloy within which a significant part of the carbon is incorporated as methyl groups. It will be considered that a significant part of the carbon is in the form of methyl groups when the infrared spectrum of the material, recorded in conditions where the instrument resolution does not affect the width of the infrared spectrum peaks, i) the peak associated with the symmetric deformation vibration of the methyl group (whose maximum is located between 1230 and 1260 $cm^{-1}$) at a height higher than the three quarters of that of the absorption band associated with the elongation vibrations of the C—H links between 2800 and 3100 $cm^{-1}$; ii) no absorption is observed, associated with the elongation vibrations of the C—H links between 3000 and 3100 $cm^{-1}$, whose amplitude exceeds the quarter of the height of the absorption band associated with the elongation vibrations of the C—H links between 2800 and 3000 $cm^{-1}$.

Unlike the materials of the invention, the Si/C composite materials and the SiC materials including a significant graphite phase are opaque.

Let's call α the quotient of the concentration of carbon atoms [C], related to the sum of the atom concentrations [C] and [Si] in the material (MS):

$$\alpha = \frac{[C]}{[C] + [Si]}$$

Preferably, in the material of the invention: 5%≤α 40%, Advantageously: 10%≤α≤30%.

The coating may be consisted of a stack of methylated amorphous silicon layers (MS), i.e. a succession of similar or different layers alternating with each other, in particular layers of materials including distinct proportions of silicon and carbon. Such a stack may be repeated up to ten times. for example, the layer (MS) may include from 2 to 20 layers, preferably from 6 to 12 layers.

For the analysis of the alloy obtained, any method known by the one skilled in the art for measuring the quantity of the various elements in the alloy may be used, as the secondary-ion mass spectroscopy (SIMS) or the photoelectron spectroscopy; the optical properties may be measured by transmission or reflection spectroscopy, spectroscopic ellipsometry, photothermal deflection spectroscopy; the electronic properties may be measured by studying the current limited by the space charge.

The continuous layer may cover the whole of the substrate area that is used as an anode. The continuous layer may have, in any point of the coating surface, a thickness higher than 10 nm.

Advantageously, this thickness is substantially constant over the whole surface of the substrate. Preferably, the methylated amorphous silicon layer (MS) or the superimposition of methylated amorphous silicon layers has a thickness higher than or equal to 30 nm, advantageously higher than or equal to 100 nm, even better, higher than or equal to 500 nm. It may have a thickness going up to 10 μm.

In comparison to the materials of the prior art, it is observed that:

The material (MS) of the invention is less conductive than Si, and thus a priori less favorable for a use as a material for an electrode, in particular an anode. However, the possibility to dope the material attenuates this drawback, which has further no longer practical consequence after the lithiation of the material that still increases substantially the conductivity thereof, i.e. after a forming period of one or several charge/discharge cycles (according to the charge/discharge conditions). Moreover, as the silicon has an insufficient cyclability that limits the use thereof as an electrode material in a Li-ion battery, the cyclability of the material (MS), very higher than that of Si, and the holding of a lithium insertion ability very higher than the prior art constitute decisive advantages for an application of this type.

The deposition of the layer based on methylated amorphous silicon (MS) on the substrate (S) may be performed by any method known by the one skilled in the art, provided that it allows obtaining an amorphous alloy of silicon and carbon having advantageously the above-mentioned characteristics. The method by PECVD (plasma-enhanced chemical vapor deposition), as described in the documents Solomon et al. (Phys. Rev. B., 1988, 38, 9895-9901; Phys. Rev. B., 1988, 38, 13263-13270), may for example be used.

The methylated amorphous silicon is advantageously obtained as a thin layer deposition by plasma-enhanced decomposition of a mixture of silane ($SiH_4$) and methane ($CH_4$) in a low-power regime. This "low-power" regime corresponds to soft enough conditions of excitation of the plasma so that only the silane molecules are directly decomposed by the plasma; the carbon incorporated in the thin layer then comes from methyl groups formed by reaction of the methane molecules with the active species issued from the decomposition of the silane molecules in the plasma (see. I. Solomon et al., Physical Review B 38 (1988) 9895-9901). This "chemical" mode of incorporation has the advantage not to depend of the detail of the deposition machine geometry. Logically, taking this indirect mode of excitation into account, the ratio of the number of carbon atoms to the number of silicon atoms in the thin layer is substantially lower than the ratio of the methane concentration to the silane concentration in the gaseous mixture. In this mode of making, it is possible to obtain materials of composition a-$Si_{1-x}(CH_3)_x$:H corresponding to values of x comprised between 0 and 0.2. Beyond this maximum value, the low-power regime allows obtaining materials having ratios of the number of carbon atoms to the number of silicon atoms up to values close to 0.4, but within which a measurable proportion of the carbon atoms are no longer incorporate as methyl groups but are in a bridging position between two silicon atoms (see I. Solomon et al., Physical Review B 38 (1988) 13263-13270). However, this material remains methylated amorphous silicon within the meaning of the present document. Likewise, a material obtained outside the "low-power" regime in suitable conditions may also be considered as methylated amorphous silicon within the meaning of the present document.

The invention has also for object a method for manufacturing an electrode as described hereinabove, including at least the steps of:

(i) providing a substrate made of a conductive material in which the lithium ions cannot be inserted or only scarcely, (ii) depositing the layer based on methylated amorphous silicon on the substrate by low-power PECVD.

In particular, a material having to the expected characteristics (amorphous character, alloy) is obtained using the low-power PECVD method. Unlike the high-power PECVD method, which is used for example in JP2005-235397, the method used in the present invention allows avoiding the formation of graphite phases that make the material opaque in the red or near-infrared portion of the light spectrum and may give rise to a vibrational absorption in the region comprised between 3000 and 3100 $cm^{-1}$.

Within the meaning of the present invention, "low-power PECVD" means a PECVD at such a power that there is no or almost no direct decomposition of the methane under the effect of the electromagnetic excitation within the plasma.

As already mentioned, departing from the low-power regime does not necessary prevent from obtaining methylated amorphous silicon. Likewise, methylated amorphous silicon may be obtained by other methods known by the one skilled in the art. The material of the invention may for example be obtained by PECVD from a gaseous mixture of silane with ethane, acetylene or ethylene (see for example B. Akoaglu et al., Optical Materials 30 (1008) 1257-1267); the material of the invention may also be obtained by PECVD from methylsilane $CH_3SiH_3$ (see for example O. Joubert et al., Journal of Vacuum Science and Technology B 18 (2000) 793-798) or a mixture of this gas with silane. Whatever the method chosen, it is advantageous to choose the conditions of deposition and to add if necessary a doping gas to the precursor mixture so as to provide the material with a sufficient conductivity, in order to limit the appearance within the electrode of a series resistance liable to reduce the performance thereof in a battery.

The layer (MS) may be deposited on only a portion of the substrate (S). In this case, the deposition may be made using a mask adapted to the desired geometric configuration.

The invention is based on the PECVD deposition of an alloy of methylated amorphous silicon on a substrate, the whole constituting an anode of a Li-ion battery. This deposition is made thanks to flows of silane and methane, and possibly of one or several doping gases as for example phosphine, $PH_3$, or diborane, $B_2H_6$.

For the implementation of the method of the invention, the following parameters are preferably used:

The temperature of the substrate is comprised between 100° C. and 350° C., preferably between 150 and 320° C., advantageously between 180 and 280° C.

The power threshold for the primary decomposition of $CH_4$ in a reactor is higher than that of the silane $SiH_4$. The power used in the method of the invention is chosen to stay lower than this threshold, in such a way that there is no decomposition of the methane by the plasma.

It is chosen to apply a power lower than 0.3 $W/cm^2$, preferably lower than 0.25 $W/cm^2$, advantageously comprised between 0.03 and 0.15 $W/cm^2$.

Choosing a low power allows keeping the carbon in the $sp^3$ form, incorporating it as methyl groups and avoiding the formation of graphite phases in the material.

The gaseous flow of silane is comprised between 0.02 and 100 $cm^3$/min in the standard conditions, preferably between 0.1 and 50 $cm^3$/min in the standard conditions, advantageously between 0.5 and 30 $cm^3$/min in the standard conditions.

The gaseous flow of methane is comprised between 1 and 200 $cm^3$/min in the standard conditions, preferably between 2 and 100 $cm^3$/min in the standard conditions, advantageously between 4 and 50 $cm^3$/min in the standard conditions.

The ratio of the silane and methane flows implemented in the reactor is chosen as a function of the ratio α that is desired in the layer (MS).

The pressure during the deposition is comprised between 3 and 300 mTorr, preferably between 10 and 200 mTorr, advantageously between 25 and 100 mTorr.

The deposition is made in a conformal manner over a surface, even irregular, i.e. the material is deposited efficiently in any point of the surface. Devices having a storage capacity per unit of geometric surface area that is comparable, or even higher, than that of the devices where the active material is distributed as grains within a composite laid on a metal sheet can thus be made, even in relatively thin layers.

The material has the advantage to be a non-stoichiometric hydrogenated alloy of silicon and carbon.

The silicon-carbon links are predominantly of $sp^3$ type. The material may be doped (n or p) or lithiated before the cycling of the battery as described in the document EP 2 113 960. The thus-prepared material serves as an anodic active material for a lithium storage battery.

An object of the invention is the use of a material (MS) as described hereinabove as an active material for manufacturing an electrode, in particular as an anode material.

When the material (MS) of the present invention is used in the lithium batteries, these latter operate by insertion and de-insertion of the lithium ions, and, in some cases, it has been proven advantageous to lithiate at least partially the coating based on material (MS) before integrating it in a lithium battery. The lithiation may be performed on an electrode terminated by chemical and/or electrochemical methods. It has been observed that the pre-lithiation improves stability and the charge/discharge efficiency of the batteries.

Another object of the invention is an electrode comprising at least one substrate on which is deposited a coating comprising at least one layer based on methylated amorphous silicon, as described hereinabove. More precisely, the invention relates to an anode for a Li-ion battery.

The invention has also for object a lithium storage battery or Li-ion battery comprising such an anode.

A Li-ion battery further comprises the just-described anode, a cathode and an electrolyte.

The active material entering in the constitution of the cathode may be chosen among the materials known by the one skilled in the art, for example one or several of the following materials:

$LiNiO_2$, $LiCoO_2$, $LiMnO_2$. Possibly Ni, Co and Mn may be replaced by one or several of the elements chosen in the group comprising Mg, Mn (except for $LiMnO_2$), Al, B, Ti, V, Si, Cr, Fe, Cu, Zn, Zr.

the mixed oxides of phosphorus, lithium and of at least one metal of transition of general formula $Li_xM_zPO_4$, where x is comprised between 1 and 3 and z=1 or 2. Examples of such oxides are: $LiMnPO_4$, $LiCoPO_4$, $LiFePO_4$, $LiVPO_4F$ and $Li_3Fe_2PO_4$.

$LiMn_2O_4$, where Mn can be replaced by one or several of the elements chosen in the group comprising Ni, Co, Mg, Al, B, Ti, V, Si, Cr, Fe, Cu, Zn, Zr.

It is chosen an electrolyte known by the one skilled in the art in the field of the lithium storage batteries.

The solvent of the electrolyte is chosen among the organic solvents such as linear carbonates, saturated cyclic carbonates, unsaturated cyclic carbonates, cyclic ethers, linear ethers, linear esters and the mixture thereof. It may be mentioned, for example, ethylene carbonate, propylene carbonate, dimethylcarbonate and diethylcarbonate. Additives known by the one skilled in the art, for example vinylidene carbonate, chlorosilanes, alcoxysilanes, may be added to the solvent or the mixture of solvents used.

A lithium salt is dissolved in this solvent or this mixture of solvents. It may be chosen in the group comprising: lithium hexafluorophosphate ($LiPF_6$), lithium tetrafluoroborate ($LiBF_4$), lithium hexafluoroarsenate ($LiAsF_6$), lithium perchlorate ($LiClO_4$), lithium bis(oxalate)borate LiB$(C_2O_4)_2$ (LiBOB), lithium bis(trifluoromethanesulfonyl)imide $LiN(CF_3SO_2)_2$ (LiTFSI), lithium bis(perfluoroethanesulfonyl)imide LiN(C$_2$F$_5$SO$_2$)$_2$ (LiBETI), lithium tris(trifluoromethanesulfonyl) methylide LiC(CF$_3$SO$_2$)$_3$ (LiTFSM).

The concentration of lithium salt in the solvent or the mixture of solvents of the electrolyte is adjusted in a manner known by the one skilled in the art, for example between 0.1 and 1.5 M, preferably 1 M.

The present invention, in addition to its simplicity of implementation (only one material deposited), allows palliating the various problems encountered, and obtaining very good characteristics (good energetic capacity, good cyclability, high charge-discharge speeds), for layer thicknesses able to go from the nanometer scale to the micrometer scale.

DETAILED DESCRIPTION OF THE INVENTION

1. Method of Depositing the Material on the Substrate:

The layers of methylated amorphous silicon with which the presented results have been obtained have been made by plasma-enhanced chemical vapor deposition (PECVD) on a metallic substrate made of stainless steel. During the deposition, the substrate is heated to a temperature of 250° C. The electromagnetic excitation of the plasma at 13.56 MHz is capacitively coupled to the deposition chamber. Just before the deposition, the substrate is subjected to a plasma of hydrogen (H$_2$) (pressure 200 mTorr, power density 100 mW/cm$^2$) during 5 minutes. During the deposition, the pressure of the gaseous mixture in the chamber is comprised between 35 and 45 mTorr, and the flow rate of the gaseous mixture is fixed at 20 cubic centimeters per minute in the standard conditions (20 sccm). The power density provided to the plasma is comprised between 60 and 100 mW/cm$^2$. These conditions allow being in the above-described "low-power" regime for which the speed of deposition not depends much of the carbon concentration of the methylated amorphous silicon obtained. In our condition, this speed of deposition is of about 20 nm per minute. The carbon content x of the material of composition a-Si$_{(1-x)}$(CH$_3$)$_x$:H depends on the composition of the silane/methane mixture. To reach a given value x, the proportion of methane g in the gaseous mixture (i.e. the ratio of the partial pressure of methane to the pressure of the gas) is given by the following formula (I. Solomon et al., Physical Review B 38 (1988) 9895-9901):

$g=11.4x/(1+9x)$.

2. Study of the Material by Infrared Spectroscopy:

A deposition of various layers of a-Si$_{(1-x)}$(CH$_3$)$_x$:H by PECVD deposition in low-power regime as described hereinabove at §1 has been performed on a single-crystal silicon substrate so as to measure simply the transmission infrared absorption. The composition of the gaseous mixture calculated from the formula given at the preceding paragraph allowed to make layers of material with a carbon content of 10%, 20%, 30%, 37%. A high-power deposition (500 mW/cm$^2$) has been made by way of comparison with a gaseous mixture having the same composition as that used to deposit a layer with a content of 20% in low-power regime.

Figure 1:
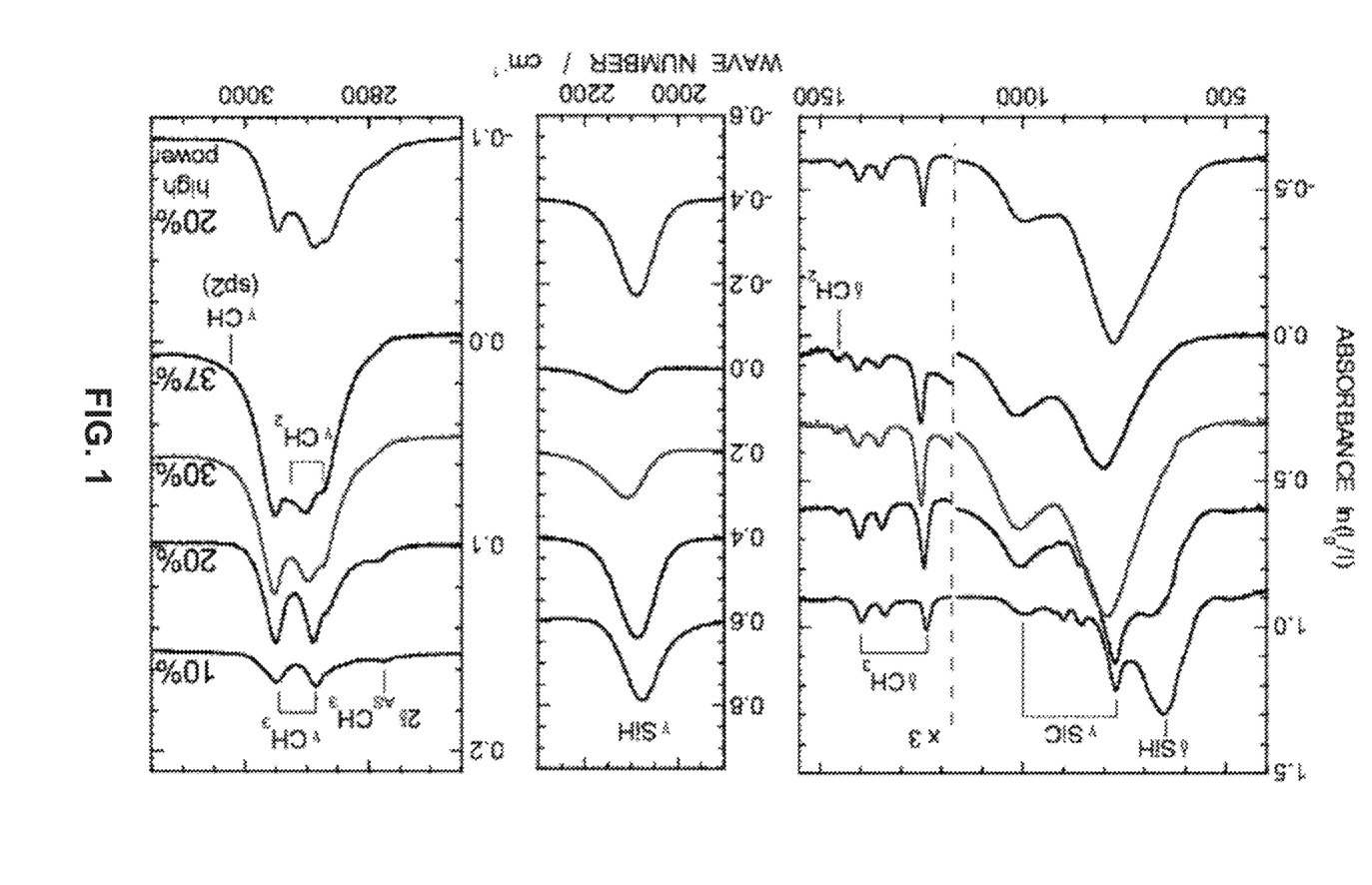
FIG. 1: Typical infrared spectra of various layers of a-Si$_{1-x}$C$_x$:H obtained by PECVD deposition in low-power regime

The corresponding infrared spectra are presented in FIG. 1: the carbon content x is indicated on each curve. The curve at the bottom of the figure represents the spectrum of the layer deposited in high-power regime.

In this later case, the highest proportion of CH$_2$-type and unsaturated carbon (=CH$_2$, indicated sp$^2$) is observed, in comparison with the corresponding curve deposited in low-power regime. The spectra have been recorded under non-polarized light and with an angle of incidence of 45°, and the absorbance has been reduced to a layer thickness of 1 micron.

3. Constitution of the Cells

The test experiences are executed in silicon-lithium cells, prepared in a glove box, and placed in sealed casings.

Figure 2:
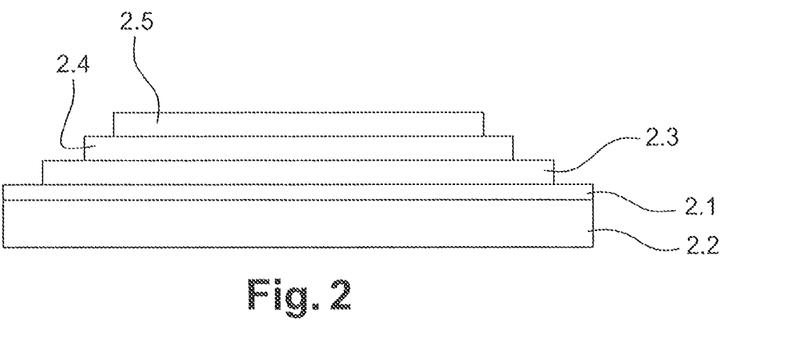
FIG. 2: Schematic representation of the cell constitution

The active part of the cell is a stacked structure shown in FIG. 2 and consisted of:

- a layer (2.1) of the material to be studied (methylated amorphous silicon) deposited on a stainless steel substrate (2.2) of 1 mm thick and of 2 cm$^2$.
- a separator (2.3) composed of a sheet of glass fiber of about 0.5 mm thick and of substantially the same size as the stainless steel substrate, impregnated with an electrolyte solution, for example a solution concentrated at 1 mol/L of LiClO$_4$ in polypropylene carbonate (PC).
- a sheet of lithium (2.4) of 300 μm thick and of the same size as the separator.
- a copper collector (2.5) of 100 μm thick.

Figure 3:
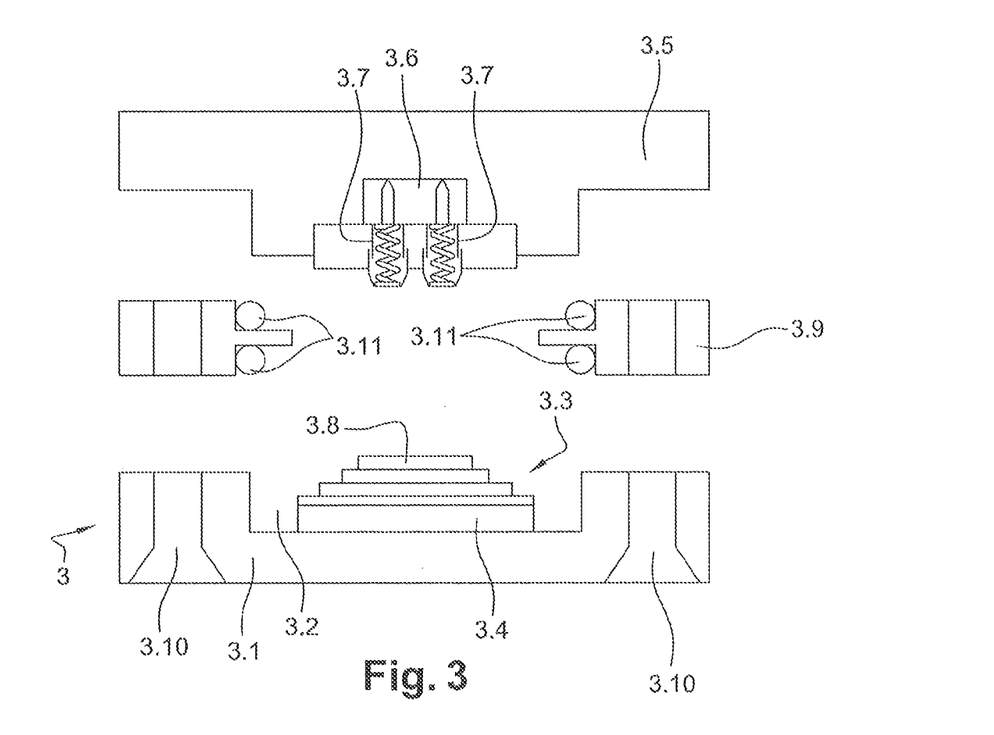
FIG. 3: Sectional representation of the sealed casing

The sealed casing (3) is consisted of three main parts shown in FIG. 3:

- a stainless steel lower element (3.1), comprising a circular receiver (3.2) able to contain the active part of the cell (3.3). This lower element is in direct contact with the stainless steel substrate (3.4) of the cell, allowing a good electric contact with this electrode.
- a stainless steel lid (3.5), in which is fixed an element (3.6) comprising four retractable brass pins (3.7) ensuring the electric contact with the copper collector (3.8) of the cell.
- an intermediate washer (3.9) made of polytrifluorochloroethylene (Kel'F), ensuring the electric insulation between the two stainless steel parts of the casing.

The stainless steel lower element (3.1) and the stainless steel lid (3.5) are fixed by four screws (3.10) to the Kel'F washer (3.9), with the screws not passing through the washer and hence not making contact with the opposite stainless steel element.

Two gaskets (3.11) made of a fluoroelastomer (Viton) ensure the seal of the casing (3), respectively between the Kel'F washer (3.9) and the stainless steel lower element (3.1) of the casing, and between the washer (3.9) and the lid (3.5).

4. Preparation of the Cells

The methylated amorphous silicon, deposited as described above at §1, is used without particular treatment after deposition.

The cells are prepared in a glove box, whose water content is about 100 ppm. The various elements of the cell are dried under vacuum, at ordinary temperature, in the lock of the glove box, during about twenty hours.

5. Characteristic Parameters of the Layers of Materials: Thickness, Carbon Content, Charge-Discharge Current The active materials of the cells are tested for various thicknesses and various carbon contents.

Tested Thicknesses:

Thin (30-70 nm) or thick (290 nm) layers of amorphous silicon (0% of carbon) or of methylated amorphous silicon, deposited on stainless steel.

Tested Carbon Contents:

0, 10, 15, 20, 25, 33% of carbon.

Various charge/discharge currents have been used to cycle the cells. In accordance with the common practice, these charge/discharge currents are indicated in a unit normalized based on the initial reversible capacity of the cell: a current of C/2 corresponds to a charge/discharge of the cell within two hours, a current of C/10 corresponds to a charge/discharge of the cell within ten hours, etc. The currents used are presented in Table 1.

TABLE 1

| | Charge/discharge currents | |
|---|---|---|
| | Thickness | |
| % carbon | 30-70 nm | 290 nm |
| 0 | C/10-C/1.5 | |
| 10 | C/10-C/1.5 | |
| 15 | C/10-C/1.5 | |
| 20 | C/1.5-C/0.5 | C/10 |
| 25 | C/10-C/1.5 | |
| 33 | C/10-C/1.5 | |

The cells have all been cycled at ordinary temperature (20-25° C.).

6. Cycling Results a) Cycling Behavior of the Cells

Figure 4:
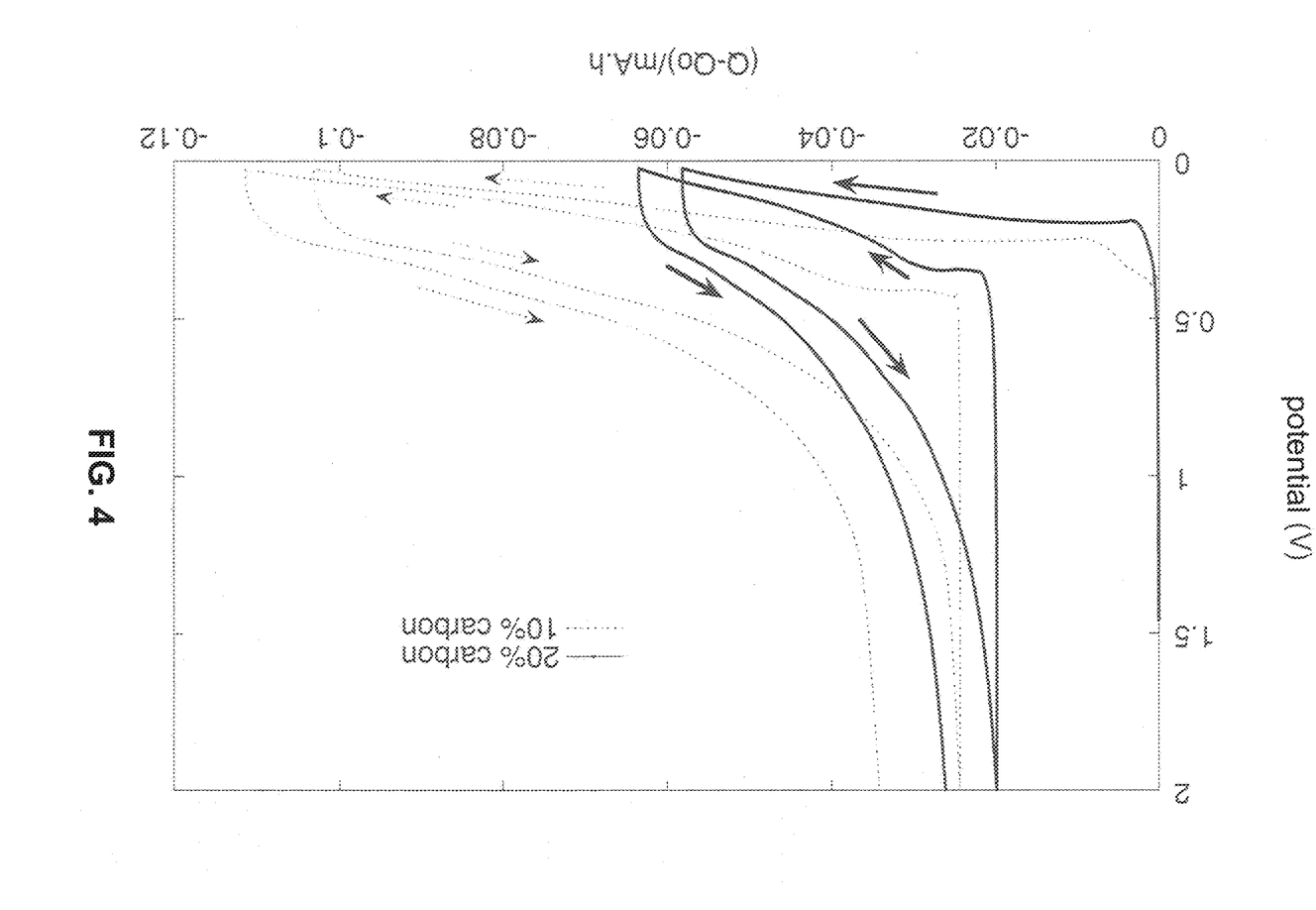
FIG. 4: Graphic representation of the variation of the potential as a function of the charge during the two first cycles of two cells

FIG. 4 shows the evolution of the potential during the two first cycles of two cells of 65 nm and 50 nm thick, for methylated amorphous silicon containing 10% of carbon, and 20% of carbon, respectively, cycled at C/10, as a function of the charge applied to the electrode. The counter-electrode is a metallic lithium electrode, such that the potential is always positive, and the charge state corresponds to a potential close to zero.

This figure highlights irreversible capacities of 25% of the capacity of first charge for the methylated amorphous silicon containing 10% of carbon, and of 34% for the methylated amorphous silicon containing 20% of carbon. The arrows show the direction of variation of the potential.

Figure 5:
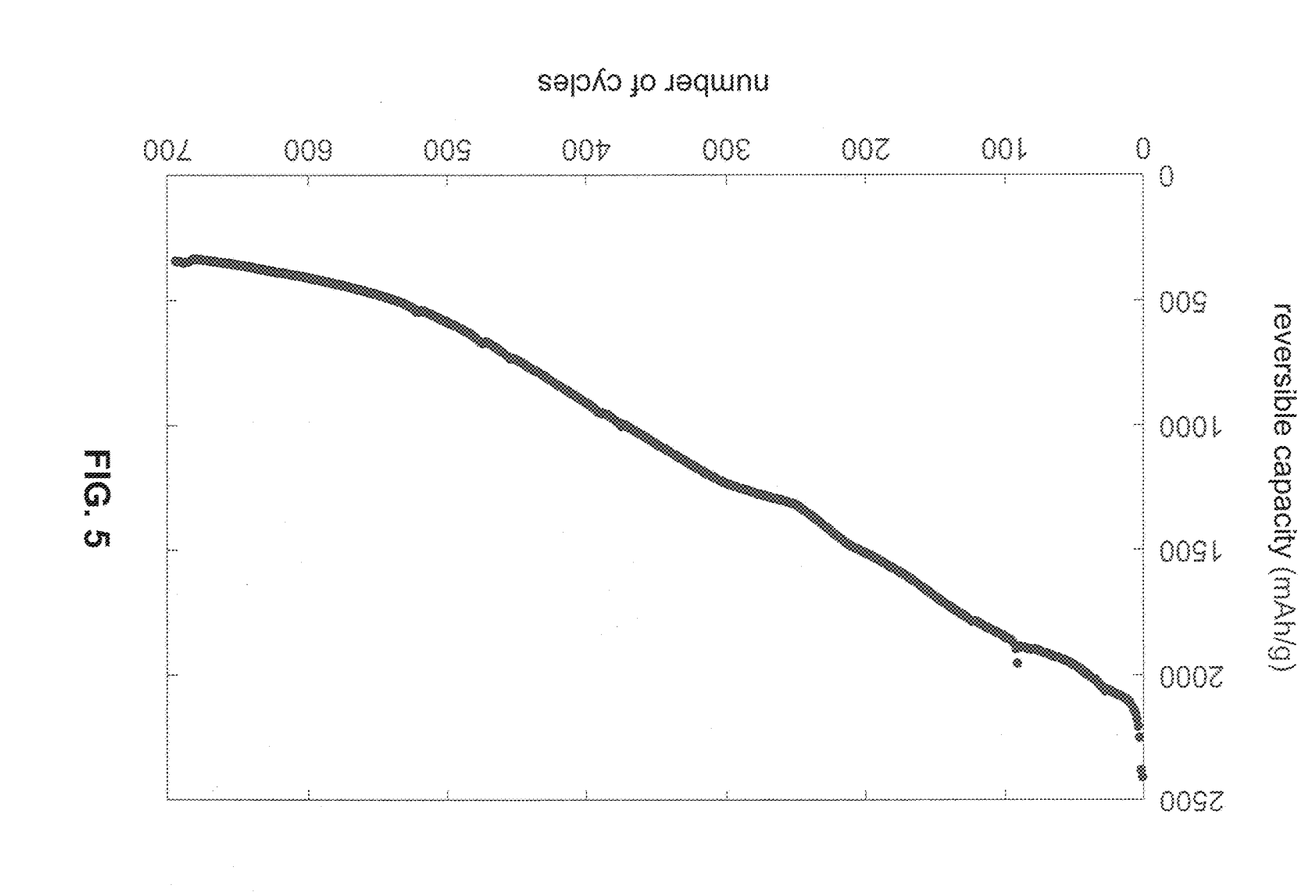
FIG. 5: Graphic representation of the variation of the mass capacity of a cell as a function of the number of cycles

FIG. 5 shows the evolution of the mass capacity of a cell with a methylated amorphous silicon electrode containing 15% of carbon, for a thickness of 60 nm, cycled at C/1.5.

b) Effect of the Carbon Content

Figure 6:
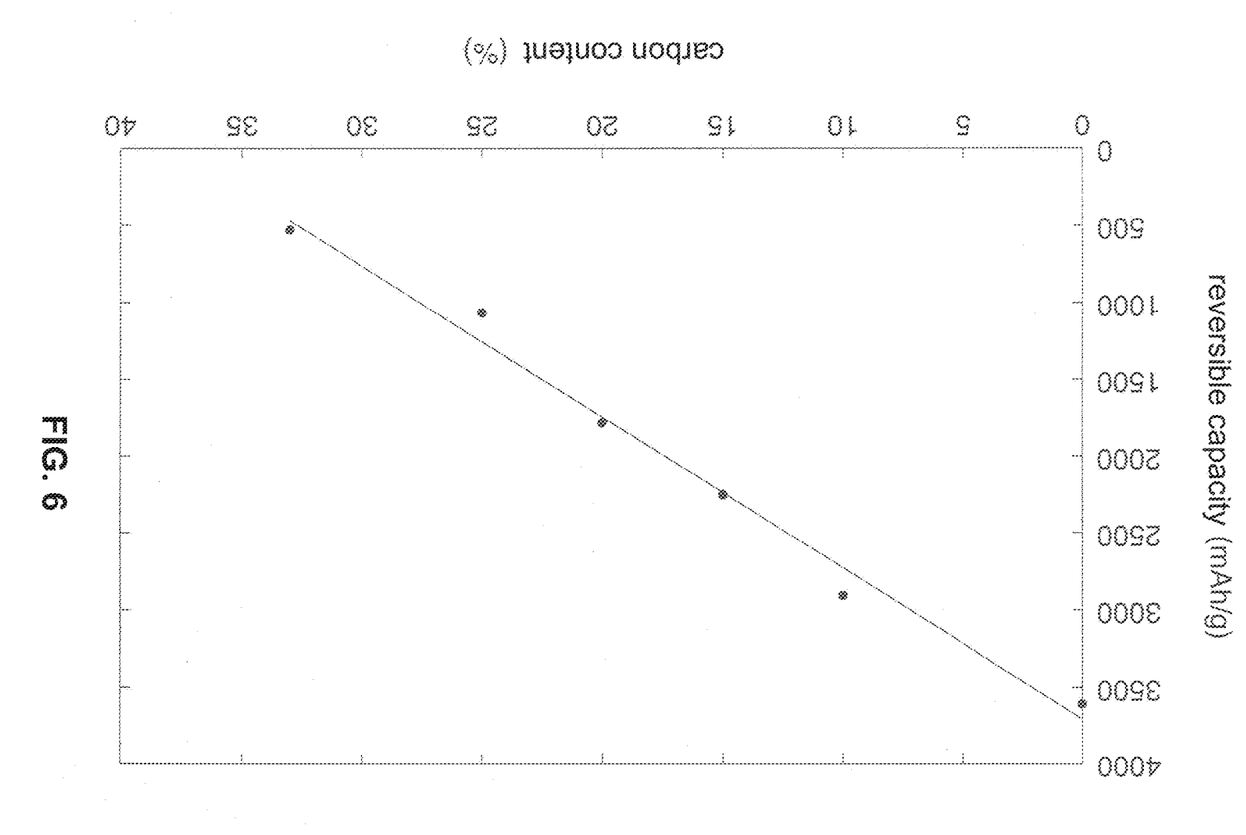
FIG. 6: Graphic representation of the variation of the initial reversible mass capacity of a measured cell as a function of the carbon content

FIG. 6 shows the variation of the initial reversible mass capacity measured as a function of the carbon content.

Figure 7:
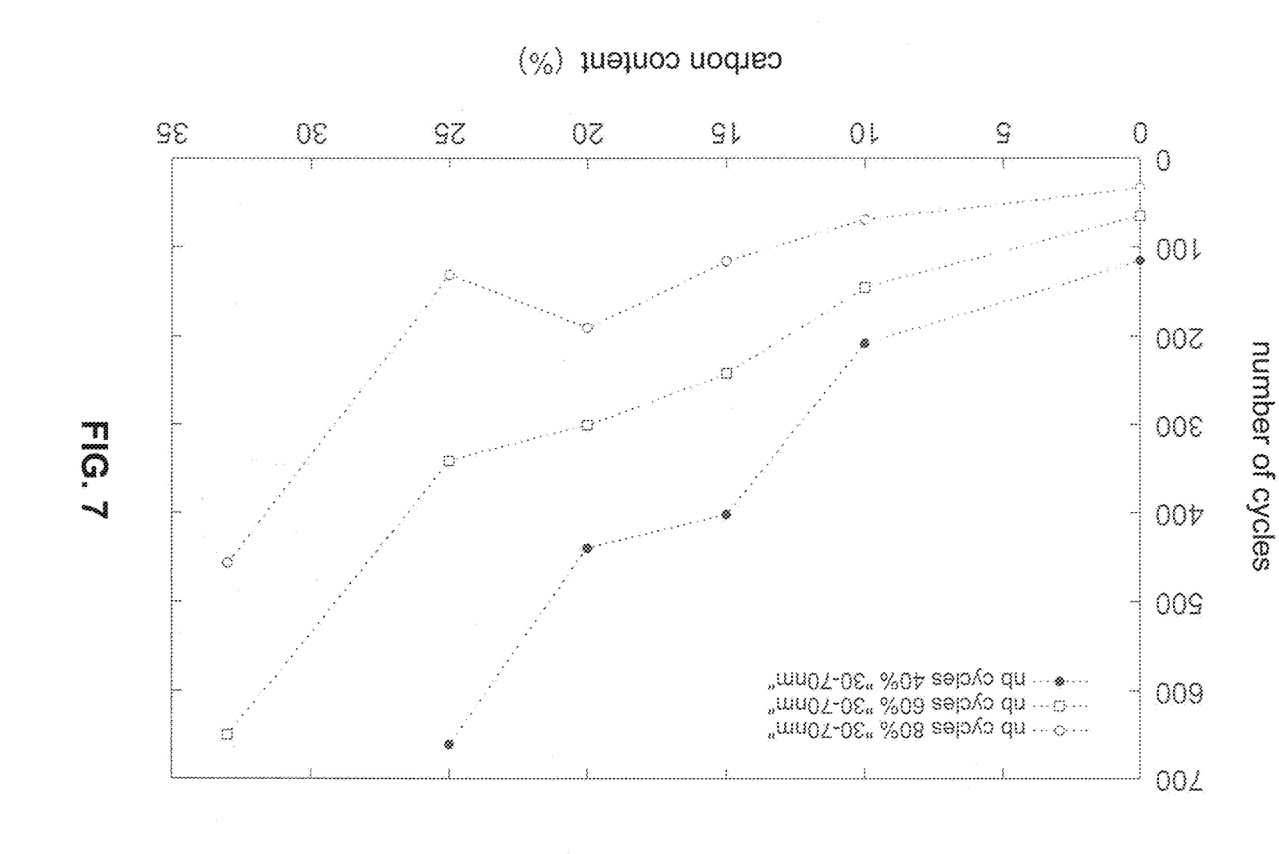
FIG. 7: Graphic representation of the life span of the cells as a function of the carbon content

FIG. 7 shows the number of cycles after which the capacity is reduced to 80%, 60% and 40% of the initial capacity, as a function of the carbon content, for layers of 30-70 nm thick. These numbers of cycles highly increase as a function of the carbon content.

c) Effect of the Thickness

Figure 8:
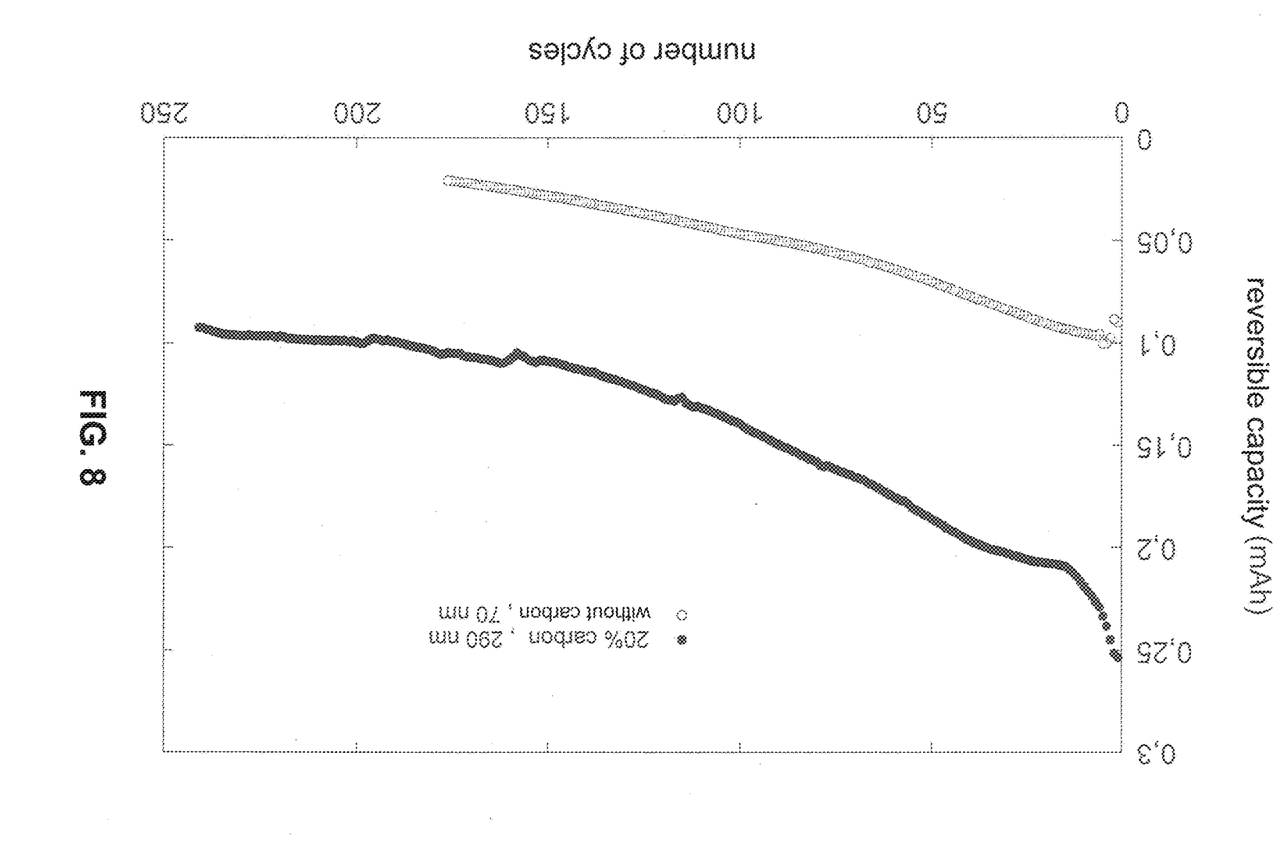
FIG. 8: Graphic representation of the variation of the capacities of two cells with and without carbon

FIG. 8 compares the variations of reversible capacity of two cells: one with an electrode of 70 nm thick made of pure amorphous silicon (without carbon), the other with an electrode of 290 nm thick made of methylated amorphous silicon containing 20% of carbon: despite a lower mass capacity, the thick layer with 20% of carbon shows a better total capacity (and surface capacity) than the thin layer without carbon. Its evolution with the number of cycles also shows a slower degradation of the capacity. The reversible capacity of the thick cell reaches a maximum after a few cycles. This "forming" period is not shown here.

Figure 9:
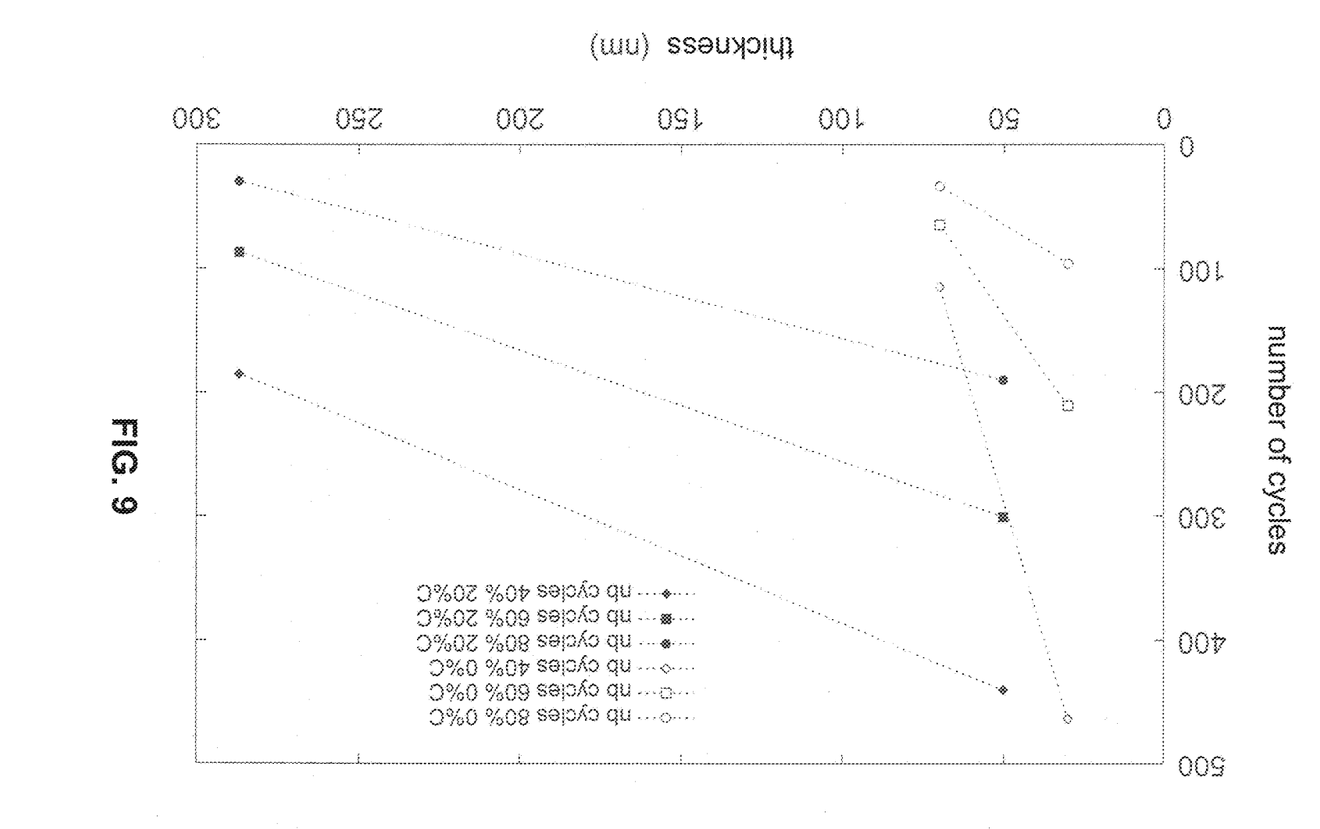
FIG. 9: Graphic representation of the life span of the cells as a function of the thickness for carbon contents of 0% and 20%.

FIG. 9 illustrates the durations after which the capacities of the cells are reduced to 80%, 60%, and 40% for cells made of pure amorphous silicon (without carbon), of 30 and 70 nm thick, and with 20% of carbon, of 50 and 290 nm thick.

The capacity of the cells with a methylated amorphous silicon electrode is less degraded as a function of the thickness than that of the cells without carbon. The cells of 290 nm thick with a methylated amorphous silicon electrode containing 20% of carbon have a greater surface capacity and a better cyclability than the cells without carbon of 70 nm thick.

d) High Charge/Discharge Speeds

The material supports correctly high charge/discharge speeds. A cell of 50 nm thick with a methylated amorphous silicon layer of 20% of carbon content has been cycled at C/0.5. The number of cycles after which its residual capacity has been reduced to 80, 60 et 40% was respectively:

80% initial C: 60 cycles

60% initial C: 480 cycles

40% initial C: 1200 cycles.

The capacity decreases more rapidly to 80% of the initial capacity than for a slower charge-discharge speed. Beyond this initial decrease, the values are of the same order, or even slightly better than those obtained for less rapid cycling processes.

Finally, the coulombian efficiency is particularly high for this high charge-discharge speed: higher than 90% after the $3^{rd}$ cycle, 95% after the $4^{th}$ cycle and tending to 99-99.8% after the $60^{th}$ cycle.

The invention claimed is:

1. An electrode comprising:
   at least one substrate comprising at least one layer based on a metal selected from the group consisting of copper, nickel, iron, stainless steel, molybdenum, tungsten and an alloy thereof, on which is deposited a coating including at least one material based on methylated amorphous silicon,
   wherein the methylated amorphous silicon is doped by inclusion of atoms chosen among atoms of the group consisting of phosphorus, boron, arsenic, antimony, aluminum, gallium, indium and bismuth.

2. The electrode according to claim 1, wherein the material based on methylated amorphous silicon comprises 50 to 100% of methylated amorphous silicon in mass fraction.

3. The electrode according to claim 1, wherein the coating based on methylated amorphous silicon is in the form of a continuous layer having a thickness of between 30 and 70 nm.

4. The electrode according to claim 1, wherein the material based on methylated amorphous silicon is deposited directly on the layer based on a metal or an alloy of metals.

5. The electrode according to claim 1, wherein the substrate has a rough surface.

6. The electrode according to claim 1, wherein the methylated amorphous silicon has an infrared spectrum wherein:
i) a peak associated with a symmetrical deformation vibration of a methyl group, whose maximum is located between 1230 and 1260 cm$^{-1}$, at a height higher than three quarters of an absorption band associated with elongation vibrations of the C—H links between 2800 and 3100 cm$^{-1}$;
ii) no absorption is observed, associated with elongation vibrations of C—H links between 3000 and 3100 cm$^{-1}$, whose amplitude exceeds a quarter of a height of an absorption band associated with elongation vibrations of the C—H links between 2800 and 3000 cm$^{-1}$.

7. The electrode according to claim 1, wherein, if α refers to a quotient of a concentration of carbon atoms [C], related to a sum of atom concentrations [C] and [Si] in the at least one material based on methylated amorphous silicon:

$$\alpha = \frac{[C]}{[C]+[Si]}$$

$$5\% \leq \alpha \leq 40\%.$$

8. The electrode according to claim 1, wherein the material based on methylated amorphous silicon is deposited directly on the layer based on a metal which is a metallic film.

9. The electrode according to claim 1, wherein the methylated amorphous silicon has the chemical formula (II):

$$a\text{-Si}_{1-x}(CH_3)_{x-y}(CH_2)_y:H \text{ with } 0<x\leq 0.4 \text{ and } y\leq x \qquad (II).$$

10. The electrode according to claim 9, wherein the methylated amorphous silicon has the chemical formula (I):

$$a\text{-Si}_{1-x}(CH_3)_x:H \text{ with } 0<x\leq 0.4 \qquad (I).$$

11. The electrode according to claim 1, wherein the coating based on methylated amorphous silicon is in the form of a continuous methylated amorphous silicon layer, or of a superimposition of a plurality of continuous methylated amorphous silicon layers, said continuous methylated amorphous layer or the superimposition of the plurality of continuous methylated amorphous silicon layers having a thickness higher than or equal to 30 nm.

12. The electrode according to claim 11, wherein the thickness of the continuous methylated amorphous silicon layer, or the superimposition of the plurality of continuous methylated amorphous silicon layers, goes up to 10 μm.

13. The electrode according to claim 11, wherein the thickness of the continuous methylated amorphous silicon layer, or of the superimposition of the plurality of continuous methylated silicon layers, is greater than or equal to 100 nm.

14. The electrode according to claim 11, wherein the thickness of the continuous methylated amorphous silicon layer, or of the superimposition of the plurality of continuous methylated amorphous silicon layers, is greater than or equal to 500 nm.

15. A lithium storage battery comprising:
as an anode an electrode which comprises:
at least one substrate, the at least one substrate comprising at least one layer based on a metal selected from the group consisting of copper, nickel, iron, stainless steel, molybdenum, tungsten and an alloy thereof; and
a coating including at least one material based on methylated amorphous silicon is deposited on the at least one substrate.

16. The lithium storage battery according to claim 15, wherein the methylated amorphous silicon has the chemical formula (I):

$$a\text{-Si}_{1-x}(CH_3)_x:H \text{ with } 0<x\leq 0.4 \qquad (I).$$

17. The lithium storage battery according to claim 15, wherein the material based on methylated amorphous silicon comprises 50 to 100% of methylated amorphous silicon in mass fraction.

18. The lithium storage battery according to claim 15, wherein the coating based on methylated amorphous silicon is in the form of a continuous layer having a thickness comprised between 30 and 70 nm.

19. The lithium storage battery according to claim 15, wherein the material based on methylated amorphous silicon is deposited directly on the layer based on a metal or an alloy of metals.

20. The lithium storage battery according to claim 15, wherein the substrate has a rough surface.

21. The lithium storage battery according to claim 15, wherein the methylated amorphous silicon is doped by inclusion of atoms chosen among atoms of phosphorus, boron, arsenic, antimony, aluminum, gallium, indium or bismuth.

22. The lithium storage battery according to claim 15, wherein the methylated amorphous silicon is has an infrared spectrum wherein:
i) a peak associated with the symmetrical deformation vibration of a methyl group, whose maximum is located between 1230 and 1260 cm$^{-1}$, at a height higher than three quarters of a height of an absorption band associated with elongation vibrations of C—H links between 2800 and 3100 cm$^{-1}$; and
ii) no absorption is observed, associated with elongation vibrations of C—H links between 3000 and 3100 cm$^{-1}$, whose amplitude exceeds a quarter of a height of an absorption band associated with elongation vibrations of C—H links between 2800 and 3000 cm$^{-1}$.

23. The lithium storage battery according to claim 15, wherein the methylated amorphous silicon has the chemical formula (II):

$$a\text{-Si}_{1-x}(CH_3)_{x-y}(CH_2)_y:H \text{ with } 0<x\leq 0.4 \text{ and } y\leq x \qquad (I).$$

24. The battery according to claim 23, wherein, if a refers to a quotient of a concentration of carbon atoms [C], related to a sum of the atom concentrations [C] and [Si] in the at least one material:

$$\alpha = \frac{[C]}{[C]+[Si]}$$

$$5\% \leq \alpha \leq 40\%.$$

25. A method for manufacturing the electrode according to claim 1, comprising at least the steps of:
(i) providing the at least one substrate; and
(ii) depositing the coating on the substrate by PECVD using a power lower than 0.3 W/cm$^2$.

26. The method according to claim 25, wherein the coating based on methylated amorphous silicon is in the form of a continuous methylated amorphous silicon layer, and the continuous methylated amorphous silicon layer, or a superimposition of a plurality of continuous methylated amorphous silicon layers, has a thickness higher than or equal to 30 nm.

27. The method according to claim 25, wherein the coating based on methylated amorphous silicon is in the form of a continuous methylated amorphous silicon layer, and the continuous methylated amorphous silicon layer, or a superimposition of a plurality of continuous methylated amorphous silicon layers, has a thickness higher than or equal to 10 μm.

28. The method according to claim 25, wherein the temperature of the substrate is comprised between 150 and 320° C.

29. The method according to claim 25, wherein the temperature of the substrate is comprised between 180 and 280° C.

30. The method according to claim 25, wherein step (ii) is carried out by PECVD using the power lower than 0.25 W/cm².

31. The method of claim 25, wherein step (ii) is carried out by PECVD using the power comprised between 0.03 and 0.15 W/cm², the gaseous flow of methane is comprised between 1 and 200 cm³/min.

32. The method according to claim 25, wherein:
a temperature of the substrate is between 100° C. and 350° C.,
the power is lower than 0.3 W/cm²,
a gaseous flow rate of silane is between 0.02 and 100 cm³/mn under standard conditions, and
a gaseous flow rate of methane is between 1 and 200 cm³/min under standard conditions.

33. The method according to claim 32, wherein step (ii) is carried out using the gaseous flow rate of silane is between 0.1 and 50 cm³/min under standard conditions, and
the gaseous flow rate of methane is between 2 and 100 cm³/min under standard conditions.

34. The method according to claim 32, wherein the gaseous flow rate of silane is between 0.5 and 30 cm³/min under standard conditions, and
the gaseous flow of methane rate is between 4 and 50 cm³/min under standard conditions.

\* \* \* \* \*